United States Patent [19]

Pechette

[11] Patent Number: 5,230,214

[45] Date of Patent: Jul. 27, 1993

[54] RECIRCULATING ZONE INDUCING MEANS FOR AN AUGMENTOR BURNING SECTION

[75] Inventor: Thomas F. Pechette, Palm Beach Gardens, Fla.

[73] Assignee: United Technologies Corporation, Hartford, Conn.

[21] Appl. No.: 942,540

[22] Filed: Sep. 9, 1992

[51] Int. Cl.[5] .............................................. F02K 3/10
[52] U.S. Cl. ........................................ 60/261; 60/725
[58] Field of Search .................. 60/261, 266, 725, 752, 60/39.826, 39.83

[56] References Cited

U.S. PATENT DOCUMENTS 4,798,048  1/1989  Clements .............................. 60/261

Primary Examiner—Richard A. Bertsch
Assistant Examiner—W. J. Wicker
Attorney, Agent, or Firm—Norman Friedland

[57] ABSTRACT

Juxtaposed recirculation zones for the pilot in the burner of an augmentor for a gas turbine engine is created by fabricating the engine's tail cone in two components and including an annular gap defined between the juncture of both components that injects a stream of cooling air radially into the augmentor's gas path for eliminating or minimizing screeching in the augmentor.

6 Claims, 3 Drawing Sheets

RECIRCULATING ZONE INDUCING MEANS FOR AN AUGMENTOR BURNING SECTION

This invention was made under a U. S. Government contract and the Government has rights herein.

TECHNICAL FIELD

This invention relates to augmentors for gas turbine engines and particularly to the burner section and its pilot mounted in the tail cone of the gas turbine engine.

BACKGROUND ART

U.S. Pat. No. 4,798,048 granted to T. R. Clements on Jan. 17, 1989 entitled Augmentor Pilot and assigned to United Technologies Corporation, the assignee common to this patent application, discloses and claims a pilot embedded in the tail cone of the gas turbine engine. The pilot serves to create a recirculation zone for supporting combustion in the augmentor's burner section. Actuation of the augmentor initiates fuel flow from the spray bars which, in a well known manner, is ignited by an igniter or a flash of flame from the main engine burner. The tail cone, which is mounted on the rear end of the turbine exhaust case and extends into the augmentor is particularly and judiciously contoured to define a smooth aerodynamic diffuser and transition section between the main engine and augmentor to assure proper operation in the non-afterburning and afterburning operations. As disclosed in the aforementioned patent, the generally conically shaped tail cone fairing toward the apex extending axially to the aft end of the augmentor includes a step change at the base forming a shoulder which articulately defines the pilot section of the augmentor. Fuel from typical spray bars feed the pilot and the combination of the fuel and the recirculation of the engine's fluid working medium adjacent the pilot maintain a stable combustion process.

While the apparatus designed according to the teachings of the aforementioned patent is adequate for certain application it has for other applications proven to be inadequate. In particular, the recirculation pattern created by the step-change pilot introduces a condition of periodic violent pressure fluctuations generated by the unsteady release of energy during the afterburning combustion process occurring in the augmentor duct. This high frequency cyclic vibration, otherwise known as screech, can become so intense that it can reach destructive proportions. Additionally, screech under certain scenarios can cause rapid deterioration or failure of the flame holder. The typical method of preventing screech is by including a perforated liner internally mounted in the augmentor dust. The porosity i.e. the number of cooling feed holes in the linear are pre-ascertained to avoid the screech condition. Further, as is disclosed in U.S. Pat. No. 4,798,048 supra, includes means for separating the rear recirculation zone downstream of the pilot. As noted therein, this patent suggests the use of a jet of cooling air to be injected axially into the gas path for separating the recirculation zones. The cooling air forms a sheet of high velocity air for substantially preventing combustion in the downstream zone.

I have found that I can prevent screech from occurring in the pilot by including means other than a porous liner of the type discussed immediately above by the method of radially injecting a sheet of cooling air in the gas path. This invention contemplates introducing a second recirculation zone in juxtaposition to the heretofore known recirculation zone which is located downstream thereof as viewed relative to the direction of the engine's gas path by injecting an annular airstream of cooling air radially into the gas path. The tail cone is constructed with a base and conical portion where the two portions are joined by flanges arranged to provide means for radially injecting the circumferential air stream into the gas path.

DISCLOSURE OF INVENTION

An object of this invention is to provide an improved pilot for an augmentor for a gas turbine engine.

A feature of this invention is to provide means for creating a second and juxtaposed recirculation zone just downstream of the recirculation zone of the augmentor pilot embedded in the tail cone.

A still further feature of the invention is to provide a discreet radial annular jet stream of cooling air extracted from the cooling air bled from the engine's fan or compressor section and being disposed in a judicious location in the tail cone adjacent the pilot.

A still further feature is to provide a radially extending plate-like member and a radially extending protrusion extending into the gas path adjacent the pilot to define an annular passageway for injecting cooling air generally perpendicular to the augmentor's gas path.

A still further feature is to provide a tail cone fabricated in two separate sections, the base section and cone section, where the base includes a step change for housing the pilot of the augmentor burner and the junction of the base section and cone section include means for creating a second recirculation zone.

The foregoing and other features of the present invention will become more apparent from the following description and accompanying drawings.

BEST MODE FOR CARRYING OUT THE INVENTION

For the sake of simplicity and convenience only that portion of a gas turbine engine and augmentor are shown to describe the invention. Additional details of the construction of the augmentor and gas turbine engine can be obtained by referring to U.S. Pat. No. 4,798,048 supra, which is incorporated herein by reference. Suffice it to say, that the augmentor is essentially a ram jet engine attached and disposed co-axially relative to the engine's center line to the exhaust case of a turbo jet or turbo fan engine. It basically is a thrust producing power plant that is characterized as being relatively simple and is comprised of four basic parts, the augmentor duct, the fuel nozzles or spray bar, the flame holder and a variable area exhaust nozzle.

In a typical augmentor, actuation of the augmentor causes fuel to be introduced into the augmentor's burner section and a portion is fed to the pilot. Once ignited, the pilot serves to create a recirculation zone where a portion of the heated gases from the engine's fluid working medium recirculates in proximity to the pilot for sustaining combustion while maintaining a stable condition.

Figure 1:
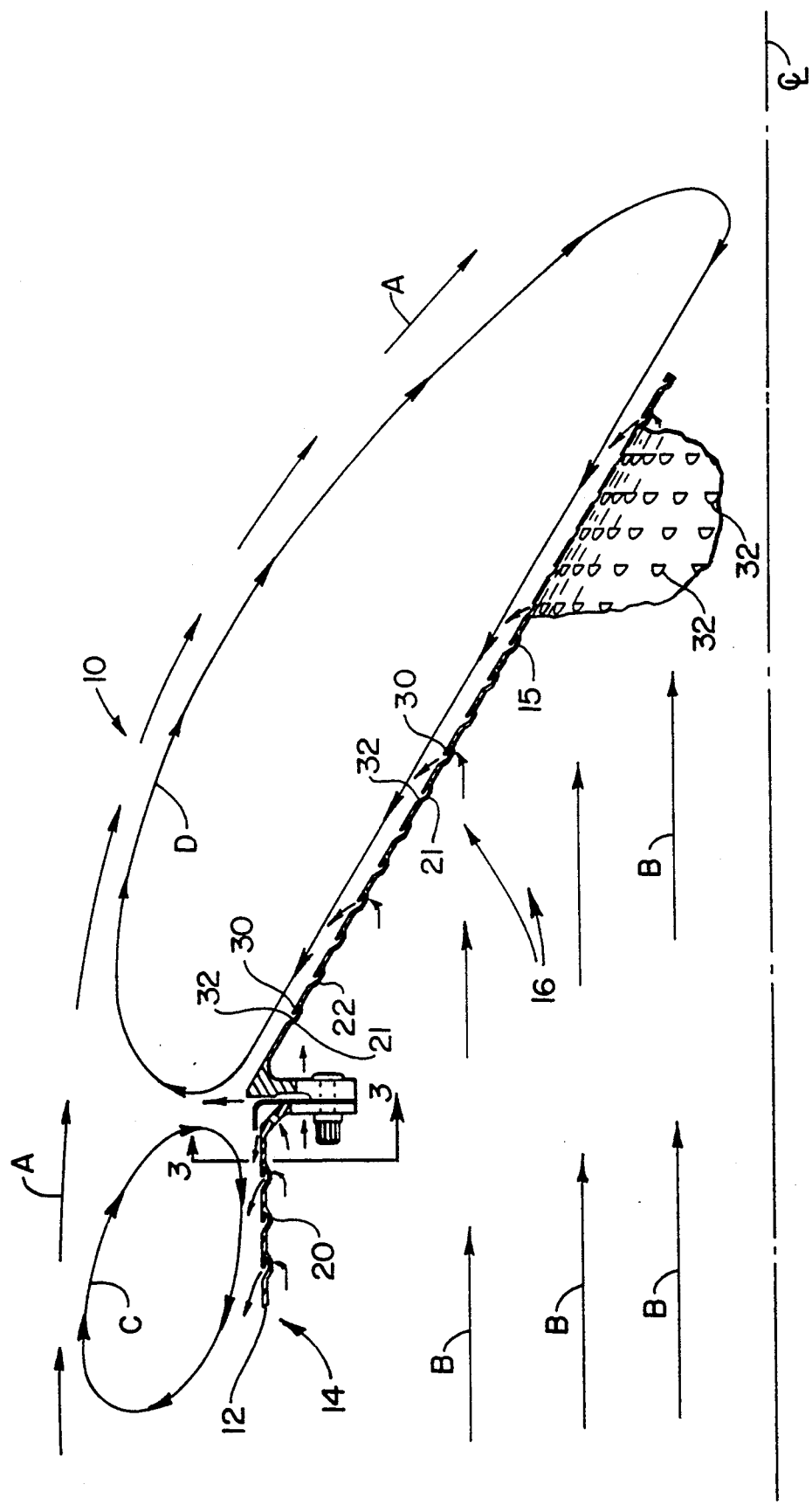
FIG. 1 is a sectional view, partly in full, showing the tail cone in the augmentor of a gas turbine engine and showing the details of this invention.
Figure 3:
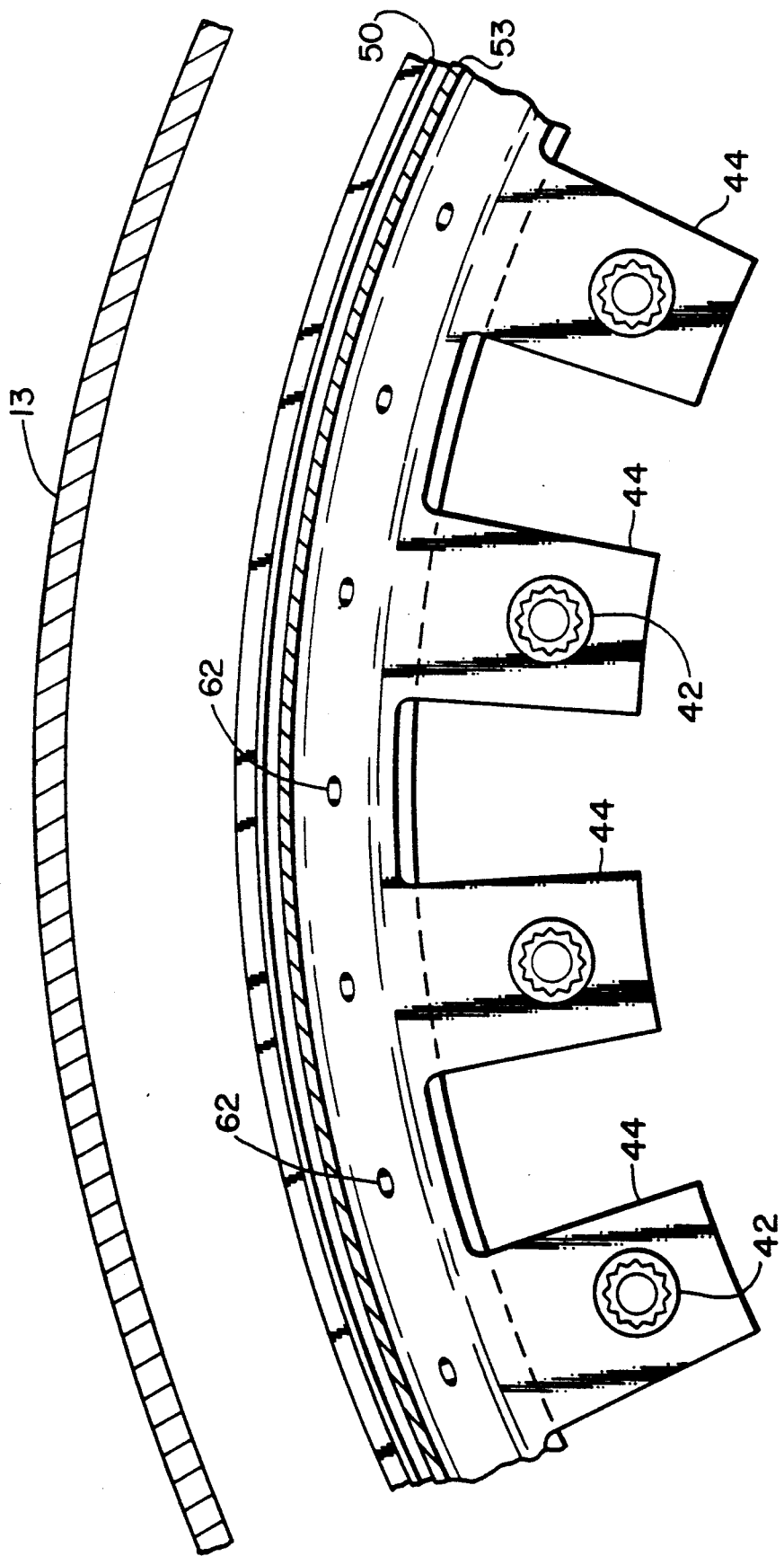
FIG. 3 is a partial front end view in elevation of the apparatus depicted in FIG. 2.

As viewed from FIG. 1 the tail cone, generally illustrated by referenced numeral 10 is comprised of base section 12 defining the pilot generally illustrated by reference numeral 14 and the conically shaped aft section generally illustrated by reference numeral 16. The hot gases illustrated by the reference A arrows discharging from the turbine (not shown) of the gas turbine engine is constrained to flow between the boundary defined by the tail cone and the augmentor duct 13 (FIG. 3) which together define a diffuser.

Figure 2:
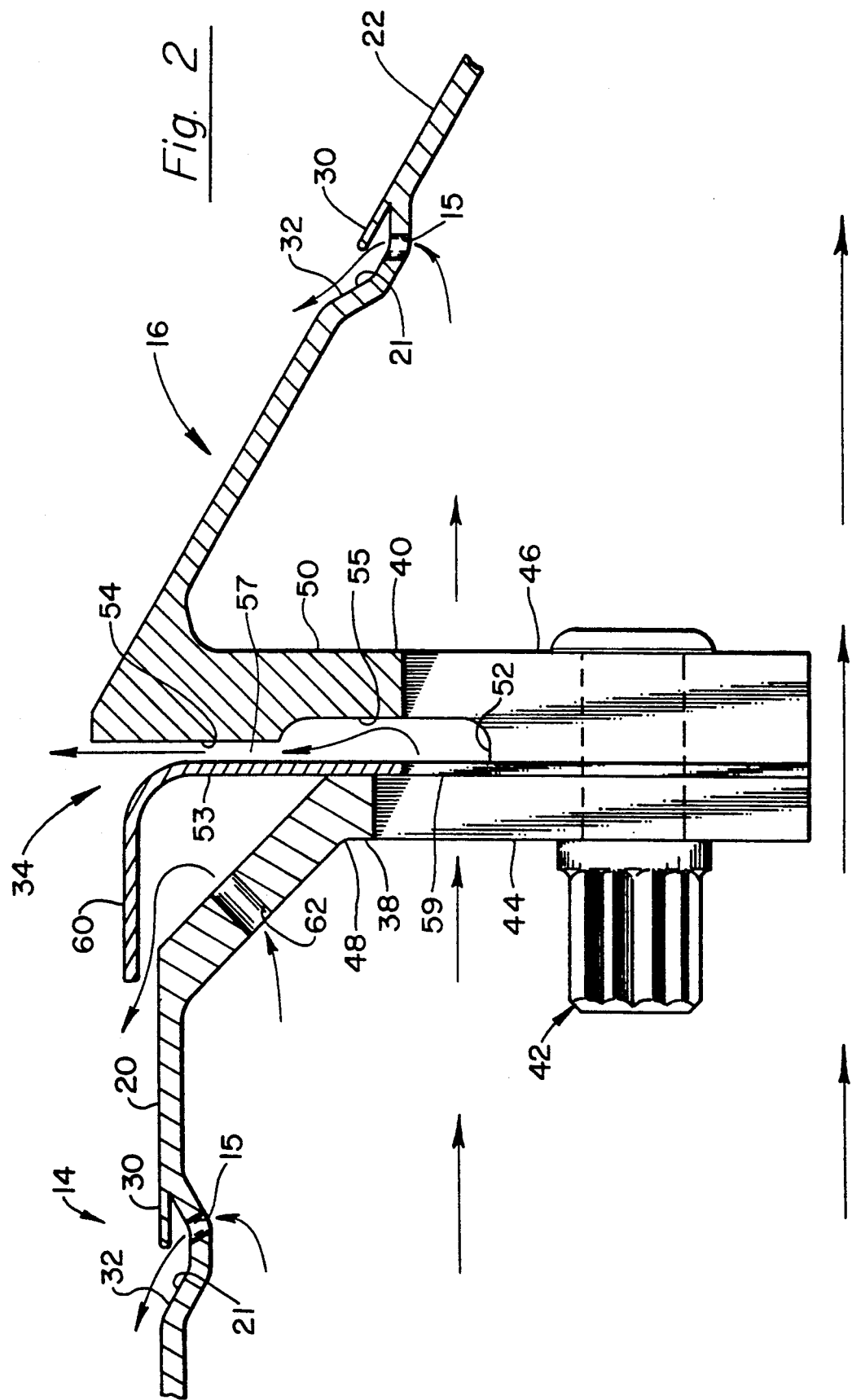
FIG. 2 is an enlarged partial view in section illustrating the details of this invention.

Cooling air, typically bled from an intermediate stage of the compressor (not shown) indicated by the referenced arrow B and after providing cooling and buffering for the bearing compartment (not shown), flows to the interior of tail cone 10 for cooling the metallic skin of the tail cone. While there are several cooling techniques that are typically utilized the one used herein includes means for feeding cooling air through a plurality of openings 15 in the liner 20 and 22 defining the pilot 14 and cone 16. As best seen in FIGS. 1 and 2 the liner carries generally annular shaped plate-like members having a projection 30 extending over the recessed portion 21 of the liner of the base portion 20 and conical portion 22. The projection 30 and recessed portion 21 define a pocket 32.

As is apparent from FIG. 2, the openings 15 underlie the projection 30 such that the cooling air stream flowing through opening 15 impinge on the underside of projections 30, causing the flow stream to turn 90 degrees and coalesce to a film of cooling air flowing over the exterior surface of the liner of the base portion 22 and conical portion 22. Thus, it is apparent from the foregoing that the liner is cooled by several heat transfer techniques including the process of impingement, convection and film cooling all of which serves to preserve the structural integrity of the liners.

As mentioned above, the pilot in the structure disclosed in U.S. Pat. No. 4,798,048 without the axial stream egressing from the end of the pilot provides a recirculation zone that extends from the pilot to the apex of the tail cone. A pilot constructed in that manner may be satisfactory in some applications but has its shortcoming in others. In particular, it generates a recirculation zone that causes screech, which as mentioned above can not be tolerated. Injecting a stream axially into the gas path downstream of the pilot also has its shortcomings.

According to this invention, the recirculation zone in proximity to pilot 14 is constrained to stay in close proximity to the pilot and is prevented from promulgating downstream to the conical portion of the tail cone. This is accomplished by the mechanism generally indicated by referenced numeral 34.

The aft end of pilot 14 carries an angularly shaped mounting flange 38 and the forward end of cone portion 16 carries a complimentary angularly shaped mounting flange 40. The mounting flanges 38 and 40 are secured together by a plurality of nut and bolt assemblies 42 that clamps the fingers 44 and 46 extending from the annular portions 48 and 50 of mounting flanges 38 and 40 respectively.

The radial inner end portion 52 of fingers 46 is thickened so that when clamped it forms with the annular plate 53 annular gap 54 which defines radial annular passageway 57 that injects flow into the gas path. A portion of the cooling air flowing between fingers 44 and 46 impinges on the lower end of projection 55 extending radially inwardly and below the annular portion 48 is forced to flow into gap 54. The flow of air in gap 54 serves to create a radial annular jet stream that flows into the annular passageway 57 where it is ultimately injected radially into the augmentor's gas path. It is apparent from the foregoing that the flange 38 and 40 are dimensioned such that the inner diameter of the annular flange 40 is smaller than the inner diameter of annular flange 38 for defining projection 55 that intercepts the cooling air flowing between fingers 44 and 46 and causing the air to turn radially into passageway 55. The inner diameter of plate 53 is fluted to form fingers 59 that compliment the fingers 44 and 46 of flanges 38 and 40 respectfully. The outer diameter of plate 53 is bent at right angles to form a heatshield and cooling fin 60. Cooling air flows through aperture 62 to impinge on the underside of the bent portion 60 which serves to cool the flange 38, in the same manner as the members of the other liner components. Cooling air flows through opening 62 to impinge on the inner surface of cooling fin 60 which extends axially forward relative to the flow of the gas path.

As mentioned above, the inner diameter of fin 60 is annularly shaped similar to flanges 38 and 40 and carries a plurality of fingers complementary in shape to fingers 44 and 46 of annular flanges 38 and 40. Cooling air flows axially toward the apex of the tail cone 10 between the adjacent fingers and impinges on the radial extending inner portion 53 and is turned radially to egress into the annular passage 54. This creates the annular stream of cooling air that is ejected as a continuous circumferential jet of cooling air that penetrates the gas path at substantially a 90 degree angle.

This continuous circumferential jet serves to limit the axial length of the recirculation zone defined by arrows C adjacent the pilot surface wall and initiates a second recirculation zone defined by arrows D that extends along the surface of the conically aft portion of the tail cone. It has been found that by virtue of this invention the screech alluded to in the above description has been virtually eliminated.

Although this invention has been shown and described with respect to detailed embodiments thereof, it will be appreciated and understood by those skilled in the art that various changes in form and detail thereof may be made without departing from the spirit and scope of the claimed invention.

I claim:

1. For a gas turbine engine having an augmentor including duct means defining a confined passageway for conducting the engine fluid working medium through said augmentor and a combustion section, a generally conically shaped tail cone disposed centrally within said duct having a base portion and a cone portion axially extending toward the aft end of the augmentor, said cone portion being secured to said base portion at a location defining a juncture, said base section including means for defining a pilot for defining a recirculation zone for said combustion section of said augmentor, means for admitting cooling air internally of said tail cone for cooling said tail cone, and means including a radial passage disposed at said juncture between said base portion and said cone portion for injecting a portion of said cooling air radially into said engine working medium for constraining said recirculation zone to be coextensive with said base portion and for creating a second recirculation zone juxtaposed to said recirculation zone extending the axial extent of said cone portion, a thin wall defining said tail cone, said thin wall defining an interior portion for receiving the cooling air, a pair of mating flanges disposed on the downstream end of said base portion and on the upstream end of said cone portion, respectfully, means securing said mating flanges, one of said mating flanges having a wider end portion at the mating surface to form a gap between said mating flanges, for injecting the cooling air radially into said engine working medium, whereby screeching in said tail cone is minimized.

2. For a gas turbine engine as claimed in claim 1 wherein said gap extends circumferentially between said mating flanges.

3. For a gas turbine engine as claimed in claim 2 including a plate-like annular member disposed between said mating flanges and secured thereby extending radially toward said engine working medium, and defining with one of said mating flanges said gap.

4. For a gas turbine engine as claimed in claim 3 wherein one of said mating flanges disposed downstream with respect to the flow of said cooling air relative to the other of said mating flanges radially extends more inwardly relative to the other of said mating flange to turn the flow of cooling air into said gap.

5. For an augmentor for a gas turbine engine including a tailcone having a generally conical member, said engine defining a gas path for flowing the engine's working medium therethrough, said conically shaped member having an apex being disposed at the aft end relative to the flow of the gas path, means for creating a combustion zone adjacent said tailcone, said tailcone including a base section and a conical section, said conical section being secured to said base section at a location defining a juncture, means defining a first recirculation zone for stabilizing the flame in said combustion zone adjacent said base section, means adjacent said juncture between said base section and said conical section for creating a second recirculating zone adjacent the conical surface of said conical section for further stabilizing flame in said combustion zone, said means including an aperture for injecting a stream of cool air radially into said gas path, and means for supplying cooling air to said aperture, whereby said first recirculating zone and said second recirculating zone prevent screeching in said augmentor, the aft end of said base section includes a radially extending flange, the fore end of said conical section includes a mating flange, means for securing said radial flange and said mating flange to join said base section to said conical section and define an annular gap, and said means for supplying cooling air to said gap for injection an annular stream of cooling air radially into said gas path.

6. For an augmentor as claimed in claim 5 including a heat shield adjacent said juncture having a radially extending disk-shaped portion sandwiched between said radial flange and said mating flange and an axially extended portion extending axially along said base section, said means for supplying cooling air for flowing a portion of said cooling air to impinge on said axially extended portion.

* * * * *